United States Patent [19]

Rolfe

[11] 4,183,908
[45] Jan. 15, 1980

[54] CRYSTALLINE CALCIUM SULFATE DIHYDRATE AND PROCESS FOR MAKING SAME

[75] Inventor: Richard B. Rolfe, Glendale, Calif.

[73] Assignee: Southern California Edison Company, Rosmead, Calif.

[21] Appl. No.: 809,661

[22] Filed: Jun. 24, 1977

[51] Int. Cl.$^2$ ............................................. C01F 11/46
[52] U.S. Cl. .................................. 423/555; 423/266
[58] Field of Search ............... 423/168, 170, 171, 172, 423/555, 242, 266; 106/109, 110, 39; 156/39

[56] References Cited

U.S. PATENT DOCUMENTS

| | | | |
|---|---|---|---|
| 1,727,551 | 9/1929 | Lohmann | 423/313 |
| 1,790,220 | 1/1931 | Balz et al. | 423/555 |
| 1,943,497 | 3/1932 | Von Bichowsky | 423/555 |
| 2,021,699 | 11/1935 | Preismann | 423/555 |
| 2,222,385 | 11/1940 | Washburn | 423/555 |
| 3,047,447 | 7/1962 | Stasse | 423/555 |
| 3,181,985 | 5/1965 | Gates et al. | 423/170 |
| 3,410,654 | 11/1968 | Wiesboeck | 423/555 |
| 3,423,172 | 1/1969 | Cafferata | 423/172 |
| 3,445,323 | 5/1969 | Schnabel | 106/109 |
| 3,609,092 | 9/1971 | Smith | 423/313 |
| 3,615,189 | 10/1971 | Hayakawa | 423/555 |
| 3,911,093 | 10/1975 | Sherif et al. | 423/242 |
| 4,080,428 | 3/1978 | Holter et al. | 423/242 |

FOREIGN PATENT DOCUMENTS

| | | | |
|---|---|---|---|
| 2414182 | 10/1974 | Fed. Rep. of Germany | 423/555 |
| 2505304 | 8/1975 | Fed. Rep. of Germany | 423/432 |
| 2544017 | 4/1976 | Fed. Rep. of Germany | 423/555 |
| 47-16416 | 5/1972 | Japan | 423/555 |
| 47-16417 | 5/1972 | Japan | 423/555 |
| 48-16795 | 5/1973 | Japan | 423/555 |
| 50-3095 | 5/1975 | Japan | 423/555 |
| 454239 | 9/1936 | United Kingdom | 423/170 |

*Primary Examiner*—O. R. Vertiz
*Assistant Examiner*—Gary P. Straub
*Attorney, Agent, or Firm*—Lyon & Lyon

[57] ABSTRACT

By the process of the invention a unique crystalline calcium sulfate dihydrate product is precipitated from an aqueous solution of calcium sulfate and a combination of molecularly dehydrated inorganic phosphates. Also within the scope of the invention is a wallboard manufacturing process and a gypsum wallboard which comprises the gypsum of the invention.

23 Claims, No Drawings

CRYSTALLINE CALCIUM SULFATE DIHYDRATE AND PROCESS FOR MAKING SAME

BACKGROUND OF THE INVENTION

An ever-present concern in the operation of electrical power generating stations is the production of sulfur dioxide gas as an end product of the combustion process. Sulfur dioxide production is of particular concern where it is necessary to use high sulfur fuel oil or coal as the fuel for the power generating facility.

Many processes have been proposed for removing sulfur dioxide from the flue gas prior to exhausting it to the atmosphere. Some such processes are effected by contacting the flue gas with an absorption liquid such as calcium hydroxide or calcium carbonate. Although efficient sulfur dioxide removal can be obtained by lime scrubbing of the flue gases, the end product of the scrubbing step is normally a calcium sulfite sludge which presents significant waste disposal problems, especially with large power generation facilities.

It has therefore been proposed to recover calcium sulfate dihydrate from the scrubbing process instead of the commercially valueless calcium sulfite sludge. Calcium sulfate dihydrate, known as gypsum may be used in its uncalcined form ($CaSO_4.2H_2O$) as a portland cement retarder, as an agricultural soil additive, in the manufacture of plate glass, plasters and wallboard and in its calcined form ($CaSO_4.\frac{1}{2}H_2O$) in plasters, Keenes cement wallboard manufacturer and as lath.

Calcium sulfate dihydrate may be obtained from calcium sulfite by oxidizing the calcium sulfite to calcium sulfate at a relatively low pH, e.g. 3.0–5.0. In Japanese Pat. No. 694017 issued June 19, 1973, the disclosure of which is incorporated herein by reference, it is noted that the solubility of the calcium sulfite generated in a lime absorption process such as described in Japanese Public Disclosure No. 47-42377 is much more soluble in a solution having a pH of about 4.0 than in solutions having pH's above 6.5. In Public Disclosure No. 47-42377 published Dec. 15, 1972 in the Japanese Patent Gazette, which is incorporated herein by reference, sulfur oxides are removed from flue gases by lime scrubbing in two successive scrubbing towers. The absorption liquid in a first most upstream absorption tower has a pH of 3.5 to 4.5 and the absorption liquid in a second absorption facility has a pH of 6.5 to 7.5. In Japanese Pat. No. 694017 it is suggested that the sulfite slurry of the first absorption tower of Disclosure No. 47-42377 be withdrawn and processed in an oxidation tower wherein the calcium sulfite is oxidized to calcium sulfate. The calcium sulfate may then be recovered as gypsum.

Calcium sulfate dihydrate ($CaSO_4.2H_2O$) is a member of the monoclinic crystalline system and normally forms long needle-like acicular crystals when precipitated from solutions. Applicant has determined that such crystalline calcium sulate dihydrate formed by the oxidation of calcium sulfite obtained from the lime slurry scrubbing of flue gases containing sulfur oxides is unsuitable as a substitute for quarried, naturally occurring gypsum used in the manufacture of wallboard. That use accounts for 30 percent of the total United States gypsum use.

In the manufacture of wallboard, gypsum of high purity (at least about 95% $CaSO_4.2H_2O$ by weight) and low free water content (less than 1% by weight) is first obtained from naturally occurring deposits by quarrying. The quarried gypsum is then crushed, ground and milled as necessary prior to being fed to a calcining step where the dihydrate is converted to the hemi-hydrate ($CaSO_4.\frac{1}{2}H_2O$). The calcined gypsum is then rewatered to form a slurry having a viscosity suitable for feeding to the wallboard machines.

In the wallboard machine the gypsum slurry is deposited in a continuous paper mold formed from a continuous sheet of adhesive coated paper which is scored and folded by the machine. A cover sheet is applied and after a residence time of about 5 minutes the gypsum has set and bonded to the paper sufficiently to allow it to be cut into desired lengths. The cut sheets are then dried to obtain the finished product.

In order for gypsum which has been formed by crystallization from solution to be acceptable, from both a physical and economic standpoint, as a substitute for quarried gypsum in the manufacture of wallboard several criteria must be met. First, in order to satisfy material handling and calcining requirements the gypsum is preferably supplied to the battery limits of the wallboard plant with less than 5 percent free moisture, although higher levels of up to about 25% can be processed where justified by economics. Secondly, the gypsum must be at least about 95% percent calcium sulfate dihydrate. Thirdly, the level of impurities such as soluble salt, total phosphate and total sulfite must be sufficiently low so that the paper bonding characteristics of the gypsum are not adversely affected. Fourthly, the normal consistency (the amount of water which must be added to a given weight of the calcined gypsum to provide a paste of the spcified viscosity) must be within acceptable economic limits, preferably less than 80 cc's of water per 100 grams of calcined gypsum. Lastly, in order to provide for economic transportation and storing, the bulk density should be at least 50 pounds per cubic foot at less than 1 percent free water content.

Of the foregoing criteria, one of the more critical is the normal consistency/viscosity requirement. Since any water added to the calcined gypsum must be removed in the wallboard drying step, when comparatively large amounts of water are required in order to produce a paste of satisfactory viscosity the substitute gypsum becomes economically unacceptable. This results both from increased drying costs and increased water usage. In a period of shortages of both energy and water, failure to meet normal consistency requirements would eliminate a manufactured gypsum from consideration as a substitute for naturally occurring gypsum.

It is therefore an object of the present invention to crystallize from solution a calcium sulfate dihydrate which is suitable for use in the wallboard manufacturing process.

It is a further object of the invention to produce a calcium sulfate dihydrate of high purity.

It is yet a further object of the invention to provide a calcium sulfate dihydrate product having a modified, generally rhombic crystal structure which exhibits normal consistency characteristics similar to or better than those exhibited by naturally occurring gypsum.

It is a still further object of the invention to provide a calcium sulfate dihydrate product having a bulk density comparable to that of naturally occuring gypsum.

These and other objects of the invention are obtained by the modified calcium sulfate dihydrate of the invention and by the process of the invention for making the modified crystal.

SUMMARY OF THE INVENTION

By the process of the invention, a modified calcium sulfate dihydrate crystal is precipitated and crystallized from a saturated aqueous solution of calcium sulfate in the presence of an additive comprising a combination of molecularly dehydrated phosphates. The polyphosphate additive has the empirical formula:

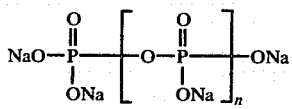

wherein n is from 3 to 14 with the higher molecular weight polymers (n=12–14) comprising at least about 75% of the total polymeric species and the lower molecular weight polymers (n=3–4) comprising at least about 15% of the total polymeric species.

The polyphosphate additive is added to the calcium sulfate solution prior to precipitation of the dihydrate at a concentration which may be from about 0.5 to about 10,000 parts per million by weight of solution. The concentration is preferably within the range of from about 20 to 400 parts per million and more preferably within the range of from about 20 to about 120 parts per million. The pH range of the solution is not critical to the crystallization of the modified calcium sulfate dihydrate and may vary over the range of from about 3 to about 14. Similarly the crystallization temperature is not critical but is preferably within the range of from about 15° C. to about 65° C.

The process of the invention produces a unique, somewhat heterogenous calcium sulfate dihydrate crystal which is bulky and has a substantially rhombic habit. The length to width ratio of the crystal is on the order of ½ as compared to length to width ratios on the order of 4–10/1 for unmodified rod shaped acicular gypsum crystals precipitated and crystallized without the additive. The gypsum product has a bulk density of at least about 50 and preferably at least about 65 pounds per cubic foot at less than 1% free moisture and a normal consistency of less than about 80 cc's of water per 100 grams of calcined gypsum. Preferably the normal consistency is less than about 80, more preferably less than about 76 and most preferably about 72. The precipitated gypsum product is preferably at least about 95% by weight calcium sulfate dihydrate on a dry basis when intended for use in wallboard manufacture.

It is also within the scope of the invention to provide a process for the manufacture of wallboard comprising employing the modified calcium sulfate dihydrate of the invention as a substitute for naturally occurring gypsum in the manufacture of wallboard. Similarly it is within the scope of the invention to provide a wallboard comprising the calcium sulfate dihydrate of the invention which has been calcined, rewatered to formulate a gypsum paste and process into the wallboard.

It has also been determined that the gypsum of the invention is suitable for use as a retarder in the manufacture of portland cement. That use is specifically included in the scope of this invention. In addition it is believed that the gypsum of the invention may, with refinements well within the scope of the art, be employed in any conventional gypsum consuming processes. Such uses are also included within the scope of the invention.

DETAILED DESCRIPTION OF THE INVENTION

The invention will be further described in terms of preparing calcium sulfate dihydrate in a continuous process from a starting material comprising a calcium sulfite slurry obtained from a sulfur dioxide scrubbing system such as described in Weir, U.S. Pat. No. 3,948,608, modified as hereinafter described. It is to be understood, however, that it is believed that the process of the invention will produce the product of the invention in many other chemical systems wherein calcium sulfate dihydrate is precipitated and crystallized from an aqueous solution.

The Weir patent, the disclosure of which is incorporated herein by reference, described an apparatus for wet scrubbing of stack gases which may comprise an elongated chamber defining a substantially horizontally extending, unrestricted flow path through which the stack gases flow. The apparatus is provided with means for spraying a liquid reagent across the chamber substantially perpendicular to the flow path of the stack gases through the chamber.

In one embodiment of the Weir invention the chamber is comprised of four separate scrubbing stages and a calcium hydroxide solution is employed as the scrubbing agent. The four stages are contiguous and reagent contacting is carried out by introducing fresh calcium hydroxide solution as the scrubbing medium of the furthest downstream stage. The scrubbing solution is collected and used as the feed for the next upstream stage and so forth through four stages. Sulfur dioxide reacts with the calcium hydroxide to form a calcium sulfite/calcium bisulfite slurry which also contains other impurities washed from the stack gases being scrubbed. According to the patent the pH of the liquid slurry discharged from the most upstream scrubbing stage is maintained at between about 6.0 and 7.0 in order to maintain a stoichiometric ratio of calcium hydroxide to sulfur dioxide of between about 1.0 and 2.0.

It has been determined that the efficiency of the scrubbing apparatus described in the Weir patent may be increased even further by adding an additional scrubbing chamber contiguous to and upstram from the chamber defined by the patent. The scrubbing reagent in this chamber is the scrubbing solution discharged from the most upstream chamber of the Weir apparatus the pH of which has been adjusted to within the range of from about 3.5 to about 5.0 either by the addition of sulfuric acid, or, in a continuously operating system, by contact with sulfur dioxide ladden stack gases without pH adjustment. It has been found that in this low pH system, the calcium sulfite is solubilized as calcium bisulfite to a much greater extent than in systems where the pH is greater than 6.0.

The solubilized calcium bisulfite in the scrubbing solution discharged from the low pH scrubbing stage may then readily be reacted with oxygen in solution to form a solution of calcium sulfate from which crystalline calciium sulfate dihydrate is precipitated. The generalized reactions for the solubilization of calcium sulfite are set forth in equations I and II, the reaction for the oxidation of the bisulfite is set forth in equation III and the reaction for the precipitation of crystalline calcium sulfate is set forth in equation IV.

I.
$$CaSO_3 \cdot \tfrac{1}{2}H_2O(s) + H_2SO_3(aq) = Ca(HSO_3)_2(aq) + \tfrac{1}{2}H_2O$$

II.
$$2CaSO_3 \cdot \tfrac{1}{2}H_2O(s) + H_2SO_4(aq) = Ca(HSO_3)_2(aq) + CaSO_4(aq)$$

III.
$$Ca(HSO_3)_2(aq) + O_2(aq) = CaSO_4(aq) + H_2SO_4(aq)$$

IV. $CaSO_4(aq) + 2H_2O = CaSO_4 \cdot 2H_2O(s)$

It was proposed by the applicant to conduct the oxidation and crystallization steps in a single reactor comprising a continuously stirred vessel into which air is sparged. The applicant further determined that the crystal size, but not the shape of the calcium sulfate dihydrate was primarily determined by the slurry retention time, the tip speed of the mixer blade and the physical parameters. However, regardless of the variation in these operating criteria the habit of the crystal was the needle-like acicular structure commonly described in the literature.

Although the calcium sulfate dihydrate produced as described above was easily filterable and of relatively high purity, its bulk density was too low and its normal consistency too high to satisfy the specifications for gypsum which is used in the wallboard manufacturing process. It was determined that the bulk density of the product could be raised and the normal consistency lowered if a calcium sulfate dihydrate having a crystal habit more resembling the ground and cleaved gypsum crystals which are obtained by milling naturally occurring gypsum was produced. After extensive investigation only two crystal modifiers were discovered which produced a crystal shape, the habit of which significantly varied from the ordinary acircular habit in the manner devised by applicant. Particularly significant were the generally rhombic crystals produced with the inorganic polyphosphate additive. The investigative procedure followed and its results are described in Example I.

EXAMPLE 1

The reaction vessel was a laboratory-scale oxidizer/crystallizer comprising a straight walled, flat bottom cylindrical vessel having a cylindrical tube of smaller diameter than the vessel inserted in the vessel along its vertical axis. The tube was of shorter length than the vessel and was supported off the bottom of the vessel such that an annular space existed between the bottom of the vessel and the bottom of the tube. The top of the tube was also below the liquid level in the vessel. Inserted in the tube near its bottom was a mixing propeller with its blades angled to propel liquid in the vessel up through the tube and force it out the top of the tube whereby a continuous circulating motion within the vessel was obtained. As air sparger was placed on the bottom of the vessel directly beneath the tube so that air sparged into the liquid in the vessel was drawn up through the tube by the action of the mixer. The feed material for the series of batch reaction tests was a calcium sulfite/calcium bisulfite slurry. The reaction conditions are set forth in Table 1 and the test results are set forth in Table 2.

TABLE 1

| | |
|---|---|
| Slurry pH | 4.0–4.75 |
| Slurry temperature | 120°–135° F. |
| Mixer tip speed | 2000 fpm |
| Air superficial velocity | 3.0 fps |
| Additives concentration | 2–1000 ppm |

TABLE 2

| NAME OF ADDITIVE | TYPE OF CHEMICAL | DOSAGE (ppm) | CRYSTAL SHAPE ACCEPTABLE |
|---|---|---|---|
| Nalco 310 | Polyolester and acrylo-nitrile | 300 | No |
| Nalco 345 | Polyolester and organic phosphate | 160–800 | No |
| Nalco 32/A09 | Polyolester and organic phosphate | 300 | No |
| Petro Ag Special | Alkyl Naphthalene Sulfonate | 100–2000 | No |
| Petro P | Alkyl Naphthalene Sulfonate | 300–1000 | No |
| Calgon CL-14 | Organic Polyphosphonate | 1–500 | No |
| Calgon CL-507 | Inorganic Polyphosphate | 50–1000 | Yes |
| Calgon CL-95 | Organic Polyphosphonate | 1–510 | No |
| Betz 419 | Polyphosphonate | 500 | No |
| Betz 426 | Not reported | 500 | No |
| Betz 1140 | Polymeric Acrylamide | 500 | No |
| Betz 1160 | Polymeric Acrylamide | 1000 | No |
| Betz 1180 | Polymeric Acrylamide | 500 | No |
| Citric Acid | Organic Acid | 1–1000 | No |
| Succinic Acid | Organic Acid | 1000 | No |
| $Fe^{+3}$ | Inorganic Metal Ion | 1000 | No |
| $Al^{+3}$ | Inorganic Metal Ion | 1000 | No |
| $NaCl/Na_2SO_4/MgSO_4$ | Inorganic Salts | 2500/20001 4000 25000 | No |
| $NaCl/Na_2SO_4/MgSO_4$ | Inorganic Salts | 2500/200001 40000 | No |
| TSP | Inorganic Phosphate | 2–1000 | Yes |

Since a crystal modifier suitable for use in producing a natural gypsum substitute must be effective in a continuous system operating for a long duration, it was next necessary to further investigate the trisodium phosphate and inorganic polyphosphate additives. That investigation is described in Examples II and III.

EXAMPLE II

In the oxidizer crystallizer described in Example III, a ten hour run was conducted using Calgon CL-50. The crystalline calcium sulfate dihydrate produced had a mean crystal size of 25 microns by weight with the crystal structure being generally rhombic, bulky crystals. The test conditions were as follows:

TABLE 3

| | |
|---|---|
| Slurry pH | 4.5 |
| Slurry temperature | 120°–135° F. |
| Mixer tip speed | 1580 fpm |
| Air superficial velocity | 0.42 fps |
| Additives concentration | 50–100 ppm |
| Feed rate | 220 # Calcium Sulfite/hr. (approx, - as $SO_2$) |
| Retention time | 220 min (approx.) |

Test B

A 24 hour continuous run was conducted using the apparatus of Test A and trisodium phosphate as the additive. The crystalline calcium sulfate dihydrate produced had a mean crystal size by weight of 40 microns and the crystal structure was an apparently unmodified acicular structure comprising long needle-like crystals. The reactions conditions were as follows:

TABLE 4

| | |
|---|---|
| Slurry pH | 4.5 |
| Slurry temperature | 120°-135° F. |
| Mixer tip speed | 1050 fpm |
| Air superficial velocity | 1.7 fps |
| Additives concentration | 200 ppm |
| Feed rate | 220 # Calcium sulfite/hr. (approx. - as SO$_2$) |
| Retention time | 220 min (approx.) |

Of the additives tested, the foregoing experiments suggested that only the Calgon CL-50 inorganic polyphosphate may be a suitable additive in a continuous wallboard quality gypsum precipitation process. In order to determine whether an acceptable process could be developed it was necessary to conduct a large scale continuous test. That test and the results obtained thereby are described in the following example.

EXAMPLE III

The sulfur dioxide removal and gypsum recovery system comprised a five stage horizontal scrubber, an oxidizer/crystallizer, a thickener and a horizontal belt vacuum filter. The horizontal scrubber was of the four stage type described in Weir patent with a fifth contiguous stage added to the upstream portion thereof as previously described in this specification. The flue gas was obtained by diverting approximately 13,000 standard cubic feet per minute of flue gas from a 15 megawatt natural gas fired electric power generating station. The flue gas was additionally spiked with sulfur dioxide in order to obtain an inlet scrubber concentration of approximately 2,500 parts per million. The liquid to gas scrubbing ratio was 51 gallons per minute per 1,000 standard cubic feet per minute of gas. The scrubbing reagent was a lime slurry which was batch-mixed and continuously fed to the reagent holding tank for the most downstream scrubber stage in order to maintain pH control. Scrubber slurry from the fifth, most upstream stage was blown down to the oxidizer/crystallizer at a rate of 20 gallons per minute in order to maintain a level of suspended solids in the scrubber slurry of from about 7 to about 10 percent by weight. The scrubber operating conditions are summarized in Table 5.

The oxidizer/crystallizer was a 4,400 gallon cylindrical vessel of the type previously described having a tubular insert and a marine propeller mixer. The operating conditions of the oxidizer/crystallizer are described in Table 6. The crystal modifier employed was Calgon CL-50 which is an aqueous solution of about 35 to 45% by weight of a combination of molecularly dehydrated phosphates also known as polyphosphates having the general formula Na$_{(n+e)}$P$_{n+1}$O$_{(3n+4)}$ wherein n is from 3-14. In Calgon CL-50 about 80% of the polyphosphate molecules have n=12-14 and about 20% have n=3-4.

The slurry sulfite concentration in the oxidizer/crystallizer was controlled and monitored by periodic wet chemical analysis. The slurry pH was maintained in the 3.0 to 4.0 range by the addition of sulfuric acid. During the test run it was determined that the Calgon CL-50 additive was most effective in producing the desired generally rhombic, bulky crystalline gypsum at a concentration of about 300 parts per million by weight. It was also determined that the polyphosphate was somewhat unstable and that complete recycle of the additive could not be achieved. Therefore a continuous feed of the additive was required. Following completion of the run a visual inspection of the oxidizer/crystallizer internals showed no evidence of scaling or erosion.

The product gypsum was continuously withdrawn from the lower portion of the oxidizer/crystallizer during the test run and fed to a conventional commercially available thickener. The thickener operating conditions are set forth in Table 7. The only problems observed in operation of the thickener were some pump and pipe plugging which occurred when the flow was allowed to intermittently stop or when the thickener underflow solids content rose above about 50% by weight.

The thickener underflow containing from about 40-50% by weight of calcium sulfate dihydrate was fed to a commercial horizontal belt vacuum filter. The filter operating conditions are set forth in Table 8. The filter was operated on a batch basis in order to dewater the thickened gypsum. The gypsum was observed to be easily filterable and provided a filter cake which was 75% by weight gypsum. Some mechanical problems were observed due to the fact that the filter was not precisely matched to the other process equipment as would occur in a commercial operation. It was also observed that, due to the fast settling characteristics of the modified gypsum crystals, it may be more commercially feasible to recover the gypsum with a centrifuge system.

The sulfur dioxide scrubber and the gypsum recovery system were operated for 154 hours with only three equipment related shutdowns of 8.5 hours, 1 hour and 4 hours duration respectively. A total of 51,200 pounds of sulfur dioxide was absorbed by the scrubber and a total of 137,000 pounds of modified crystal gypsum was produced. Approximately 120,000 pounds of this product were recovered. A typical mass flow balance for the system is set forth in Table 9.

TABLE 5

| Scrubber Operating Conditions | |
|---|---|
| No. of stages | 5 |
| Nozzles per stage | 3 |
| Gas flow | 13,000 scfm |
| L/G ratio | 51 gal./1000 scf |
| Inlet Sulfur Dioxide level | 2,500 ppm |
| Sulfur Dioxide absorbed | 4.9 lbs. Sulfur Dioxide/min. |
| Reagent | Lime |
| Lime slurry concentration | 1.4 lbs. Calcium Hydroxide/gal. |
| Lime Feedrate | 4.5 gpm |
| Spent slurry pH | 4.7-5.0 |
| Slurry temperature | 128°-130° F. |
| Slurry sulfite concentration | 2.3% as Sulfur Dioxide |
| Blowdown rate | 20 gpm |

TABLE 6

| Oxidizer Crystallizer Operating Conditions | |
|---|---|
| Volumetric capacity | 4.400 gal. |
| Mixer | 33.5 in dia. |
| Volumetric feed rate | 20 gpm |
| Sulfite feed rate | 222 lbs Sulfur Dioxide/hr. |
| Mixer tip speed | 1450 fpm |
| Retention time | 220 min |
| Acid feed rate | 50 lbs. Sulfuric Acid/hr. |
| Polyphosphate feed rate | 10 gal./day |
| Polyphosphate feed conc. | 3.9 lbs. PO$_4$/gal. |

TABLE 6-continued

| Oxidizer Crystallizer Operating Conditions | |
| --- | --- |
| Slurry polyphosphate conc. | 300 ppm wt. |
| Slurry pH | 3.0–4.0 |
| Slurry temp. | 130° F. |

TABLE 7

| Thickener Operating Conditions | |
| --- | --- |
| Volume | 6,500 gal. |
| Thickener feed | 20 gpm |
| Flocculant | None |
| Slurry feed solids | gypsum |
| Slurry feed solids conc. | 7–10% wt. as dihydrate |
| Underflow solids conc. | 40–50% wt. as dihydrate |

TABLE 8

| Filter Operating Conditions | |
| --- | --- |
| Filter cloth area | 15 sq. ft. |
| Filter vacuum | 15–25 in. Hg |
| Filter feedrate | 5–7.5 gpm |
| Filter feed solids conc. | 20–25% wt. as dihydrate |
| Filter cake solids content | 75% wt. as dihydrate |
| Solids production rate | 15–25 lbs./min. as dihydrate |

TABLE 9

| Mass Flow Balance | |
| --- | --- |
| A. Scrubber | |
| Inlet Flue Gas | Outlet Flue Gas |
| Vol. - 13,000 SCFm | Vol. - 13,300 SCFm |
| $SO_2$ - 5.4 #/min. | $SO_2$ - 0.45 #/min. |
| $H_2O$ - 62 #/min. - water | $H_2O$ - 88 "/min. 3.5 #/min. |
| Makeup Reagent- Calcium Hydroxide | −6.3 #/min. |
| B. Oxidizer/Crystallizer | |
| Feed | Discharge |
| Liquid - 20 gpm | Liquid - 20 gpm |
| Calcium Sulfite 7.5 #/min. | Dihydrate - 13.3 #/min. |
| Calcium Bisulfite 3.4 #/min. | $H_2O$ - 170.7 #/min. |
| $H_2O$ 184 #/min. | |
| C. Thickener | |
| Feed | |
| (Discharge from Oxidizer/Crystallizer) | |
| Thickened Solids | |
| 120000 # dry Calcium Sulfite dihydrate in 154 hours | |
| Liquid Overflow | |
| Approx. 20 gpm. | |
| $H_2O$ 170 #/min. | |

The gypsum product produced in the continuous test run was evaluated to determine its suitability as a substitute for naturally occurring quarried gypsum. The gypsum crystals somewhat heterogenous essentially consisting of discrete crystals having habits which were irregular and bulky but generally rhombic. The bulk density of the product when dried to less than 1% moisture was 70.3 #/cu. ft. and its normal consistency was 64 cc's water per 100 grams of moisture free gypsum. The gypsum product was 99.5% calcium sulfate dihydrate and the soluble salt, total phosphate and total sulfite concentrations totaled less than 1.0%.

The gypsum met all other wallboard quality gypsum specifications and exhibited satisfactory paper bonding characteristics. Subsequently 42 tons of the gypsum was processed through a wallboard manufacturing plant and resulted in a good 91.6% yield of a wallboard product which showed good strength and good bonding and was otherwise within manufacturing specifications.

In evaluating the modified crystal gypsum product of the invention bulk density was measured by drying the gypsum to less than 1% free moisture at temperatures below 120° C. and then determining bulk density by ASTM method D1557-70.

The normal consistency was measured as follows. The product gypsum was first calcined to convert the dihydrate to the hemi-hydrate. A 50 gram sample of the calcined gypsum was then thoroughly mixed with given volumes of water in a 250 milliliter beaker for about one minute. The gypsum paste was then gently poured onto a large, flat glass dish and allowed to set. The diameter of the set gypsum cake was then measured. A diameter of 3 inches plus or minus ¼ inch reflected a gypsum paste having the correct viscosity needed for processing into wallboard. A diameter greater than 3 inches indicated that too much water had been added and a diameter less than 3 inches that not enough water had been added. The normal consistency is that volume of water required to produce a three inch cake, corrected to a basis of 100 grams of calcined gypsum.

While the normal consistency of the Calgon CL-50 modified gypsum of the invention was less than 80 cc's of water per 100 grams of calcined gypsum, as required for wallboard manufacture, unmodified gypsum demonstrated normal consistencies ranging from 88 to 113 cc's of water per 100 grams of calcined gypsum. The normal consistency of the product obtained in the long duration trisodium phosphate run was also greater than 80 cc's of water per 100 grams of calcined gypsum.

In an attempt to lower the normal consistency of gypsum comprised of unmodified acicular, needle-shaped crystals, the gypsum was subjected to a grinding step. However that step did not significantly improve the normal consistency. It was therefore concluded that only the modified crystal gypsum product of the invention could meet wallboard manufacturing requirements.

Although the manner in which the polyphosphate additive of the invention functions to modify the calcium sulfate dihydrate crystal growth is not clearly understood, the following is believed to explain the phenomenon. In the growth of the ordinary needle-like calcium sulfate dihydrate crystals it has been postulated that the crystal faces at the tips of the needle consist predominantly of $Ca^{++}$ ions which preferentially absorb $HSO_4^-$, $SO_4^=$ and $PO_4^=$ ions. The side faces of the crystal are postulated to consist of both calcium and sulfate ions which would attact and absorb $Ca^{++}$ ions as well as $HSO_4^-$, $SO_4^=$ and $PO_4^=$ ions. It is believed that the polyphosphate additive, which is highly charged, is attracted to the calcium ions occurring predominantly on the crystal faces at the point of the needle crystal whereby crystal growth sites are blocked in such a manner as to favor the formation of the bulky, generally rhombic crystal of the invention.

Although the process of the invention has been described in terms of first solubilizing calcium sulfite to calcium bisulfite in a low pH solution and then oxidizing the calcium bisulfite to calcium sulfate, it is believed the process of the invention is applicable to any aqueous solution from which calcium sulfate dihydrate is to be precipitated. The limiting factor will be the presence of any ions in the solution which might inhibit the operation of the polyphosphate additive. Such interference may be readily determined by those skilled in the art. However, where the starting material for the process of the invention is a calcium sulfite/bisulfite slurry, the solid content may range from about 1 to about 20% by weight.

While the invention has been described in terms of a preferred embodiment, many other embodiments will be readily apparent to those skilled in the art. The invention is therefore not limited to the embodiments described but is entitled to the full scope of the appended claims.

I claim:

1. The process for the continuous precipitation of crystalline calcium sulfate dihydrate product comprising the step of continuously precipitating calcium sulfate dihydrate crystals from an aqueous mixture by reacting in said mixture a source of calcium ions and a source of sulfate ions in the presence of from about 0.5 to about 10,000 parts per million by weight of the mixture of an additive comprising a combination of molecularly dehydrated phosphates having the empirical formula:

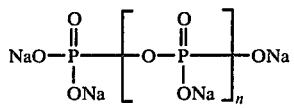

wherein n is from 3 to 14, the polymers having n equal to 12 to 14 comprise at least about 75% of the total polymeric species and the polymers having n equal to 3-4 comprise at least about 15% of the total polymeric species.

2. The process of claim 1 wherein the concentration of the additive is from about 20 to about 400 parts per million by weight of the mixture.

3. The process of claim 1 wherein the concentration of the additive is from about 20 to about 120 parts per million by weight of the mixture.

4. The process of claim 2 wherein the pH of the aqueous mixture is from about 3 to about 14 and the temperature is from about 15° C. to about 65° C.

5. The process of claim 3 wherein the pH of the aqueous mixture is from about 3 to about 14 and the temperature is from about 15° C. to about 65° C.

6. The process of claim 5 wherein the pH is from about 3 to about 6.

7. The process of claim 1 wherein said mixture is a slurry comprising calcium sulfate precursors as a source of calcium ions and sulfate ions and said process further comprises the step of chemically converting said precursors to calcium ions and sulfate ions in said mixture.

8. The process of claim 7 wherein said precursors comprise calcium sulfite, calcium bisulfite or mixtures thereof.

9. The process of claim 8 wherein calcium sulfite is the source of both calcium ions and sulfate ions in said mixture.

10. The process for the precipitation of a crystalline calcium sulfate dihydrate product comprising the steps of:

(a) feeding an aqueous mixture of at least one calcium sulfate precursor to a reaction chamber;

(b) chemically converting said precursor to calcium sulfate in said chamber; and (c) forming, in the presence of from about 0.5 to about 10,000 parts per million by weight of the mixture of an additive comprising a combination of molecularly dehydrated phosphates having the empirical formula:

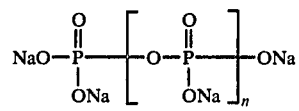

wherein n is from 3 to 14, the polymers having n equal to 12 to 14 comprise at least about 75% of the total polymeric species and the polymers having n equal to 3-4 comprise at least about 15% of the total polymeric species, a precipitate comprising calcium sulfate dihydrate crystals formed from the calcium sulfate reaction product of step b.

11. The process of claim 10 wherein steps b and c occur substantially simultaneously.

12. The process of claim 10 wherein the concentration of the additive is from about 20 to about 400 parts per million by weight of the mixture.

13. The process of claim 12 wherein the pH of the aqueous mixture is from about 3 to about 14 and the temperature is from about 15° C. to about 65° C.

14. The process of claim 10 wherein the concentration of the additive is from about 20 to about 120 parts per million by weight of the mixture.

15. The process of claim 14 wherein the pH of the aqueous mixture is from about 3 to about 14 and the temperature is from about 15° C. to about 65° C.

16. The process of claim 15 wherein the pH is from about 3 to about 6.

17. The process of claim 10 wherein said precursor comprises calcium sulfite and calcium bisulfite, said precursor being oxidized to form calcium sulfate in step b.

18. The process of claim 17 wherein said aqueous mixture comprises the effluent from a sulfur dioxide gas scrubbing system.

19. The process of claim 17 wherein the concentration of the additive is from about 20 to about 400 parts per million by weight of the mixture.

20. The process of claim 19 wherein the pH of the aqueous mixture is from about 3 to about 14 and the temperature is from about 15° C. to about 65° C.

21. The process of claim 17 wherein the concentration of the additive is from about 20 to about 120 parts per million by weight of the mixture.

22. The process of claim 21 wherein the pH of the aqueous mixture is from about 3 to about 14 and the temperature is from about 15° C. to about 65° C.

23. The process of claim 22 wherein the pH is from about 3 to about 6.

* * * * *

UNITED STATES PATENT AND TRADEMARK OFFICE
CERTIFICATE OF CORRECTION

PATENT NO. : 4,183,908
DATED : January 15, 1980
INVENTOR(S) : RICHARD B. ROLFE

It is certified that error appears in the above-identified patent and that said Letters Patent are hereby corrected as shown below:

Column 1, line 58 "sulate" should read -- sulfate --;
Column 2, line 33 "spcified" should read -- specified --;
Column 4, line 18 "described" should read -- describes --;
Column 4, line 46 "upstram" should read -- upstream --;
Column 4, line 62 "calciium" should read -- calcium --;
Column 5, line 37 "acircular" should read --acicular--;
Column 5, line 44 "Example 1" should read --Example I --'
Column 5, line 58 "As" should read --An--;
Column 6 in Table 2, line 15, "Nalco 32/A09" should read -- Nalco 32A09--;
Column 6, Table 2, line 24, "CL-507" should read --CL-50 --;
Column 6, Table 2, line 38, "20001" should read --2000/--;
Column 6, below "Example II" in the center of the column insert -- Test A--;
Column 7, line 61, should read --$Na_{(n+3)}P_{n+1}O_{(3n+4)}$--;

Signed and Sealed this

Fifteenth Day of July 1980

[SEAL]

Attest:

SIDNEY A. DIAMOND

Attesting Officer

Commissioner of Patents and Trademarks